(12) United States Patent
Kong et al.

(10) Patent No.: US 12,118,666 B2
(45) Date of Patent: Oct. 15, 2024

(54) METHOD, DEVICE AND SYSTEM FOR COOPERATIVELY CONSTRUCTING POINT CLOUD MAP

(71) Applicant: BEIJING JINGDONG QIANSHI TECHNOLOGY CO., LTD., Beijing (CN)

(72) Inventors: Qi Kong, Beijing (CN); Jinfeng Zhang, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 43 days.

(21) Appl. No.: 18/002,092

(22) PCT Filed: May 8, 2021

(86) PCT No.: PCT/CN2021/092280
§ 371 (c)(1),
(2) Date: Dec. 16, 2022

(87) PCT Pub. No.: WO2021/254019
PCT Pub. Date: Dec. 23, 2021

(65) Prior Publication Data
US 2023/0351686 A1  Nov. 2, 2023

(30) Foreign Application Priority Data
Jun. 17, 2020  (CN) .......................... 202010553190.5

(51) Int. Cl.
*G06T 17/05* (2011.01)
*G06T 3/40* (2024.01)
*G06T 3/4038* (2024.01)

(52) U.S. Cl.
CPC ............ *G06T 17/05* (2013.01); *G06T 3/4038* (2013.01)

(58) Field of Classification Search
CPC ... G06T 17/05; G06T 3/4038; G06T 2200/04; G06T 2200/08; G06T 2200/32;
(Continued)

(56) References Cited

U.S. PATENT DOCUMENTS 10,430,659 B2 * 10/2019 Jiang ....................... G06F 18/00
2016/0163114 A1    6/2016 Arrigoni et al.
(Continued)

FOREIGN PATENT DOCUMENTS

CN    103455144 A    12/2013
CN    109781129 A     5/2019
(Continued)

OTHER PUBLICATIONS

"First Office Action and English language translation", CN Application No. 202010553190.5, Jun. 2, 2021, 36 pp.
(Continued)

*Primary Examiner* — Vijay Shankar
(74) *Attorney, Agent, or Firm* — Myers Bigel, P.A.

(57) ABSTRACT

A method, a device and a system for cooperatively constructing a point cloud map, relating to the field of point cloud map construction. The method includes acquiring point cloud data of corresponding road sections respectively acquired by a plurality of vehicles when moving on different road sections, an overlap region being provided between any first road section and second road section which are adjacent; determining, by using the point cloud data of the overlap region, a transformation matrix for transforming the point cloud data of the second road section into the point cloud data of the first road section; using the transformation matrix to transform the point cloud data of the second road section; and splicing the point cloud data of the first road (Continued)

section and the transformed point cloud data of the second road section to construct a point cloud map of the preset route.

19 Claims, 3 Drawing Sheets

(58) Field of Classification Search
CPC . G06T 2207/10016; G06T 2207/10028; G06T 2207/30236; G06T 2207/30252; G06T 2210/56; G06T 7/33; G06T 7/73; G06T 2207/30184; G01C 21/3841; G01C 21/3848; G06V 10/803; G06V 20/56; G06F 18/2321
See application file for complete search history.

(56) References Cited

U.S. PATENT DOCUMENTS

| | | |
|---|---|---|
| 2018/0024565 A1 | 1/2018 | Fridman |
| 2019/0266748 A1 | 8/2019 | Ahmad et al. |
| 2019/0323843 A1 | 10/2019 | Yu et al. |
| 2021/0263135 A1* | 8/2021 | Chen ................... G06F 18/2163 |
| 2022/0172396 A1* | 6/2022 | Okuma .................. G06T 7/215 |
| 2023/0083965 A1* | 3/2023 | Liu ....................... G06V 10/762 |
| | | 382/103 |
| 2023/0104225 A1* | 4/2023 | Zhou ..................... G01C 21/38 |
| | | 701/400 |
| 2024/0037825 A1* | 2/2024 | Xu .......................... G06T 19/00 |

FOREIGN PATENT DOCUMENTS

| | | |
|---|---|---|
| CN | 110795523 A | 2/2020 |
| CN | 111208492 A | 5/2020 |
| CN | 111681172 A | 9/2020 |

OTHER PUBLICATIONS

"International Search Report and Written Opinion of the International Searching Authority with English translation", International Application No. PCT/CN2021/092280, Aug. 5, 2021, 17 pp.
"Rejection Decision and English translation", CN Application No. 202010553190.5, Mar. 2, 2022, 20 pp.
"Second Office Action and English language translation", CN Application No. 202010553190.5, Sep. 27, 2021, 35 pp.
"Communication with Supplementary European Search Report", EP Application No. 21824786.4, Jul. 18, 2024, 13 pp.

* cited by examiner

METHOD, DEVICE AND SYSTEM FOR COOPERATIVELY CONSTRUCTING POINT CLOUD MAP

CROSS-REFERENCE TO RELATED APPLICATIONS

The present disclosure is a U.S. National Stage Application under 35 U.S.C. § 371 of International Patent Application PCT/CN2021/092280 filed on May 8, 2021, which is based on and claims priority of Chinese application for invention 202010553190.5, filed on Jun. 17, 2020, the disclosure of both of which are hereby incorporated into this disclosure by reference in its entirety.

TECHNICAL FIELD

The present disclosure relates to the field of point cloud map construction, in particular to a method, device and system for cooperatively constructing point cloud map.

BACKGROUND

To construct point cloud maps used in the field of autonomous driving, in general, special map data collection vehicles equipped with expensive high-precision map data collection equipment, such as high-precision integrated inertial navigation equipment, high-precision multi-line laser radar equipment, etc. need to collect data on preset routes, and then some back-end equipment is used to process the collected data offline.

SUMMARY

Some embodiments of the present disclosure provide a method for cooperatively constructing point cloud map, including:
obtaining point cloud data of different road sections respectively collected by a plurality of vehicles when they move on the corresponding road sections, wherein different vehicles correspond to different road sections in a preset route, and any adjacent first road section and second road section have an overlapping area;
determining a transformation matrix for transforming point cloud data of the second road section to point cloud data of the first road section using point cloud data of the overlapping area;
transforming the point cloud data of the second road section using the transformation matrix; and
splicing the point cloud data of the first road section and the transformed point cloud data of the second road section to construct a point cloud map of the preset route.

In some embodiments, the point cloud data of each road section comprises single frame point clouds of the road section and corresponding label data of each single frame point cloud; wherein determining a transformation matrix for transforming point cloud data of the second road section to point cloud data of the first road section comprises: determining the transformation matrix for transforming point cloud data of the second road section to point cloud data of the first road section by matching a single frame point cloud of the overlapping area in the first road section and a single frame point cloud of the overlapping area in the second road section with the same label data.

In some embodiments, determining a transformation matrix for transforming point cloud data of the second road section to point cloud data of the first road section comprises:
taking the single frame point cloud of the overlapping area in the first road section and the single frame point cloud of the overlapping area in the second road section with the same label data as a target point cloud and a source point cloud respectively, and obtaining matched point pairs of the source point cloud and the target point cloud;
constructing a rotation-translation matrix based on the matched point pairs;
transforming the source point cloud using the rotation-translation matrix;
calculating an error between the transformed source point cloud and the target point cloud;
performing the above steps iteratively in the case that the error is greater than a preset error; or stopping the iteration and determining a rotation-translation matrix corresponding to this error as the transformation matrix for transforming point cloud data of the second road section to point cloud data of the first road section in the case that the error is not greater than the preset error.

In some embodiments, the label data corresponding to each single frame point cloud in each road section comprises at least one of: current global position information and heading information of a vehicle on this road section when the single frame point cloud of the road section is collected; an environmental image captured by the vehicle on this road section when the single frame point cloud of the road section is collected.

In some embodiments, the method further comprises: judging as different single frame point clouds with the same label data in the case that a similarity of the feature vectors of the environment images corresponding to different single frame point clouds is greater than the preset value; or judging as different single frame point clouds with the same label data in the case that the global position information and heading information of the vehicles corresponding to different single frame point clouds are the same.

In some embodiments, each single frame point cloud of the second road section comprises: point cloud data of each single frame point cloud of the second road section and local pose information corresponding to the single frame point cloud, wherein the point cloud data of the single frame point cloud of the second road section comprises: position information of each point constituting the single frame point cloud in a local coordinate system with a vehicle in the second road section as an origin, wherein the local pose information corresponding to the single frame point cloud of the second road section is: relative pose information of a current pose of the vehicle in the second road section when the single frame point cloud of the second road section is collected with respect to a start pose of the vehicle when a start single frame point cloud of the second road section is collected; wherein transforming the point cloud data of the second road section using the transformation matrix comprises: for each single frame point cloud of the second road section, multiplying its corresponding local pose information by the transformation matrix first, and then by the point cloud data of the single frame point cloud.

In some embodiments, the method further comprises: for each road section, clustering various points of this road section according to its point cloud data; from the point cloud data of each road section, removing a point set obtained through clustering that matches a shape of a preset moving object.

In some embodiments, the point cloud data of each road section is point cloud data from which a point set of a preset moving object has been removed, wherein the removing operation comprises clustering, by a vehicle in each road section, various points of the road section based on the point cloud data of the road section, and removing a point set obtained through clustering that matches a shape of a preset moving object from the point cloud data of the road section.

In some embodiments, constructing a point cloud map of the preset route comprises: constructing a point cloud map of the preset route using LeGO-LOAM according to the point cloud data of the first road section and the transformed point cloud data of the second road section.

In some embodiments, the method further comprises:
obtaining point cloud data of a third road section in the preset route collected by any vehicle, wherein the third road section that is changed and a fourth road section that is unchanged in the preset route have an overlapping area;
determining a transformation matrix for transforming point cloud data of the third road section to point cloud data of the fourth road section using point cloud data of the overlapping area;
transforming the point cloud data of the third road section using the transformation matrix;
splicing the point cloud data of the fourth road section and the transformed point cloud data of the third road section to construct a point cloud map of the preset route.

Some embodiments of the present disclosure provide a system for cooperatively constructing point cloud map, comprising:
a plurality of vehicles each configured to collect point cloud data of a corresponding road section when it moves in the corresponding road section, and send the collected point cloud data to a device for cooperatively constructing point cloud map, wherein different vehicles correspond to different road sections in a preset route;
a device for cooperatively constructing point cloud map, configured to execute the method for cooperatively constructing point cloud map described in any one of the above embodiments.

In one embodiment, the device for cooperatively constructing point cloud map is one of a plurality of vehicles.

Some embodiments of the present disclosure provide a device for cooperatively constructing point cloud map, comprising:
a communication device configured to obtain point cloud data of different road sections respectively collected by a plurality of vehicles when they move on the corresponding road sections;
a memory; and
a processor coupled to the memory and configured to perform the method for cooperatively constructing point cloud map according to any one of the above embodiments based on instructions stored in the memory.

In one embodiment, the device for cooperatively constructing point cloud map is one of a plurality of vehicles; the device for cooperatively constructing point cloud map further comprises:

a point cloud data collection device, configured to collect various single frame point clouds of a road section when it moves on the corresponding road section;
a pose detection device, configured to, for each single frame point cloud, detect relative pose information of a current pose corresponding to this single frame point cloud with respect to a start pose corresponding to a start single frame point cloud;
a label data collection device, configured to collect label data corresponding to a single frame point cloud when the single frame point cloud is collected.

In some embodiments, the label data collection means comprises: a global positioning and navigation device; or a camera device.

Some embodiments of the present disclosure further provide a non-transitory computer readable storage medium stored a computer program which when executed by a processor implements the steps of the method for cooperatively constructing point cloud map of any one of the above embodiments.

BRIEF DESCRIPTION OF THE DRAWINGS

The drawings needed to be used in the description of the embodiments or related art will be briefly introduced below. The present disclosure can be more clearly understood from the following detailed description with reference to the accompanying drawings.

It is obvious that, the drawings illustrated as follows are merely some of the embodiments of the present disclosure. For a person skilled in the art, he or she may also acquire other drawings according to such drawings on the premise that no inventive effort is involved.

DETAILED DESCRIPTION

Below, a clear and complete description will be given for the technical solution of embodiments of the present disclosure with reference to the drawings of the embodiments.

Unless otherwise specified, the use of the terms "first" and "second" below does not denote any quantity or timing, but are merely used to distinguish between different objects in the description.

The embodiment of the present disclosure provide a scheme of cooperatively constructing point cloud map by multiple vehicles, wherein different vehicles collect point cloud data of different road sections in a preset route, point cloud data in an overlapping area of two adjacent road sections is used to determine a transformation matrix used for point cloud data of the two adjacent road sections, point cloud data of different road sections are spliced based on transformed point cloud data to construct a point cloud map of the entire route. Therefore, the efficiency of constructing the point cloud map of the entire route is improved, and it can be applied to the business scenario of online point cloud map construction. In addition, each vehicle collects point cloud data of one road section, rather than point cloud data of the entire route. Therefore, the accuracy requirements of the map data collection equipment carried by each vehicle are reduced.

Figure 1:
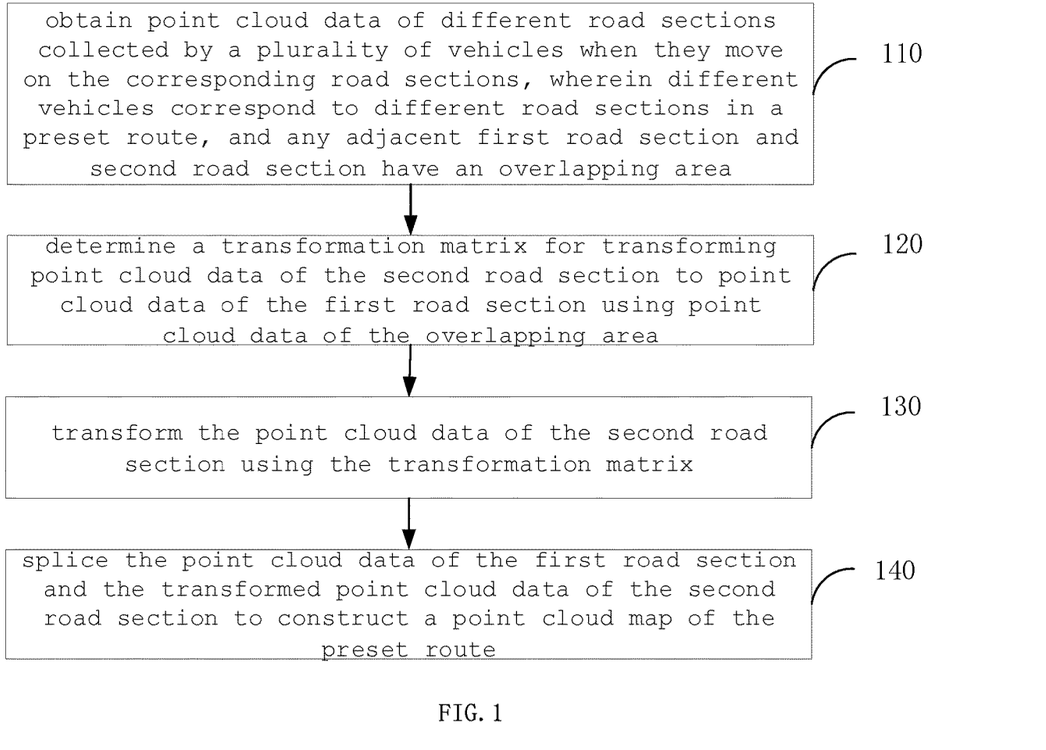
FIG. 1 shows a schematic flowchart of a method for cooperatively constructing point cloud map according to some embodiments of the present disclosure.

FIG. 1 shows a schematic flowchart of a method for cooperatively constructing point cloud map according to some embodiments of the present disclosure.

As shown in FIG. 1, the method of this embodiment comprises: steps 110 to 140.

In step 110, a device for cooperatively constructing point cloud map obtains point cloud data of different road sections collected by a plurality of vehicles when they move on the corresponding road sections, wherein different vehicles correspond to different road sections in a preset route, and any adjacent first road section and second road section have an overlapping area.

The device for cooperatively constructing point cloud map may be one of the plurality of vehicles, or another device. The vehicles that collect point cloud data can be, for example, self-driving vehicles. Self-driving vehicles can collect point cloud data using their own sensors without the need of other additional sensors.

The collected point cloud data of each road section comprises: various single frame point clouds of the road section and corresponding label data of each single frame point cloud. A single frame point cloud of a road section comprises: point cloud data of the single frame point cloud and local pose information corresponding to the single frame point cloud.

The point cloud data (or the first point cloud data) of the single frame point cloud of each road section comprises: position information of each point constituting the single frame point cloud in a local coordinate system with the vehicle on this road section as the origin. The first point cloud data can be obtained, for example, by a point cloud data collection device, such as a lidar device. For each road section, the local pose information corresponding to a single frame point cloud of the road section is: relative pose information of a current pose of a vehicle on this road section when the single frame point cloud of this road section is collected with respect to a start pose of the vehicle when a start single frame point cloud of this road section is collected. The local pose information corresponding to a single frame point cloud can be obtained, for example, by a pose detection device, such as an inertial navigation device.

According to the first point cloud data of a single frame point cloud and the local pose information corresponding to the single frame point cloud, second point cloud data of the single frame point cloud can be determined. For each road section, the second point cloud data of a single frame point cloud of the road section comprises: position information of each point constituting the single frame point cloud in a local coordinate system with the start pose of a vehicle on this road section as the origin. For example, the second point cloud data of a single frame point cloud is obtained through multiplying a local pose matrix corresponding to the single frame point cloud with the first point cloud data of the single frame point cloud, which can be expressed by the following formula:

$$\begin{bmatrix} R_{3\times3} & P_{3\times1} \\ 0_{1\times3} & 1 \end{bmatrix} \begin{bmatrix} x \\ y \\ z \\ 1 \end{bmatrix} = \begin{bmatrix} x' \\ y' \\ z' \\ 1 \end{bmatrix}$$

wherein, $$\begin{bmatrix} R_{3\times3} & P_{3\times1} \\ 0_{1\times3} & 1 \end{bmatrix}$$

represents a local pose matrix, $R_{3\times3}$ represents an orientation matrix with 3 rows and 3 columns, $P_{3\times1}$ represents a position matrix with 3 rows and 1 column, (x,y,z) represents the position information of a point in the first point cloud data, (x',y',z') represents the position information of a point in the second point cloud data.

Based on the first point cloud data of each single frame point cloud of a road section and the local pose information corresponding to the single frame point cloud, or based on the second point cloud data of each single frame point cloud of a road section, a local point cloud map of this road section can be constructed.

For each road section, the label data corresponding to a single frame point cloud of the road section comprises, for example: at least one of the current global position information and heading information of the vehicle on this road section when collecting the single frame point cloud of the road section, or an environmental image captured by the vehicle on this road section when collecting the single frame point cloud of the road section. The label data is acquired by a label data acquisition device. For example, the global position information and heading information can be acquired by a global positioning and navigation device mounted on the vehicle, and the environment image can be acquired by a camera device.

In some embodiments, after acquiring the point cloud data of each road section, the device for cooperatively constructing point cloud map performs clustering on various points of each road section according to the point cloud data of each road section, for example, performs clustering on various points of each road section using the second point cloud data of each single frame point cloud of each road section (that is, the position information of each point constituting the single frame point cloud in a local coordinate system with the start pose of the vehicle in the road section as the origin), and then removes a point set obtained by clustering that matches a shape of a preset moving object from the point cloud data of each road section. Therefore, noises formed by moving objects such as pedestrians and traveling vehicles are removed from the point cloud data.

The point cloud data of each road section sent by each vehicle to the device for cooperatively constructing point cloud map may be point cloud data from which a point set of a preset moving object has been removed. This removing operation comprises performing, for each road section, clustering on various points of this road section by a vehicle on this road section according to the point cloud data of this road section, for example, performing clustering on various points of this road section using the second point cloud data of each single frame point cloud of the road section (that is, the position information of each point constituting the single frame point cloud in a local coordinate system with the start pose of the vehicle in the road section as the origin), and then removing a point set obtained by clustering that matches a shape of a preset moving object from the point cloud data of this road section. Therefore, noises formed by moving objects such as pedestrians and traveling vehicles are removed from the point cloud data. In addition, the amount of information transmission between the vehicle and the device for cooperatively constructing point cloud map can be reduced.

In step 120, the device for cooperatively constructing point cloud map determines a transformation matrix for transforming point cloud data of the second road section to point cloud data of the first road section using point cloud data of the overlapping area.

The transformation matrix for transforming point cloud data of the second road section to point cloud data of the first road section is determined by matching a single frame point cloud of the overlapping area in the first road section and a single frame point cloud of the overlapping area in the second road section with the same label data.

For example, the Iterative Closest Point (ICP) algorithm is used for matching different point clouds. Specifically, taking the single frame point cloud of the overlapping area in the first road section and the single frame point cloud of the overlapping area in the second road section with the same label data as a target point cloud and a source point cloud respectively, and obtaining matched point pairs of the source point cloud and the target point cloud; constructing a rotation-translation matrix based on the matched point pairs; transforming the source point cloud using the rotation-translation matrix; calculating an error between the transformed source point cloud and the target point cloud; performing the above steps iteratively in the case that the error is greater than a preset error; or stopping the iteration and determining a rotation-translation matrix corresponding to this error as the transformation matrix for transforming point cloud data of the second road section to point cloud data of the first road section in the case that the error is not greater than the preset error.

It is judged as different single frame point clouds with the same label data in the case that the global position information and heading information of the vehicles corresponding to different single frame point clouds are the same. Alternatively, it is judged as different single frame point clouds with the same label data in the case that a similarity of the feature vectors of the environment images corresponding to different single frame point clouds is greater than the preset value. Alternatively, it is judged as different single frame point clouds with the same label data in the case that the global position information and heading information of the vehicles corresponding to different single frame point clouds are the same, and a similarity of the feature vectors of the environment images corresponding to different single frame point clouds is greater than the preset value.

In step 130, the device for cooperatively constructing point cloud map transforms the point cloud data of the second road section using the transformation matrix.

The transformation method comprises, for example: for each single frame point cloud of the second road section, multiplying its corresponding local pose information by the transformation matrix first, and then by the point cloud data of the single frame point cloud (the first point cloud data). Thereby, the point cloud data of the second road section is transformed into the coordinate system of the first road section.

$$\begin{bmatrix} R_{3\times3} & P_{3\times1} \\ 0_{1\times3} & 1 \end{bmatrix} \begin{bmatrix} M_{11} & M_{12} & M_{13} & M_{14} \\ M_{21} & M_{22} & M_{23} & M_{24} \\ M_{31} & M_{32} & M_{33} & M_{34} \\ M_{41} & M_{42} & M_{43} & M_{44} \end{bmatrix} \begin{bmatrix} x \\ y \\ z \\ 1 \end{bmatrix} = \begin{bmatrix} x'' \\ y'' \\ z'' \\ N \end{bmatrix}$$

wherein, $$\begin{bmatrix} R_{3\times3} & P_{3\times1} \\ 0_{1\times3} & 1 \end{bmatrix}$$

represents a local pose information corresponding to a single frame point cloud, (x,y,z) represents the position information of a point in the first point cloud data of the single frame point cloud, (x'',y'',z'') represents the position information of a point in the transformed point cloud data of the single frame point cloud, and N is an intermediate product of the operation, which has no real meaning.

$$\begin{bmatrix} M_{11} & M_{12} & M_{13} & M_{14} \\ M_{21} & M_{22} & M_{23} & M_{24} \\ M_{31} & M_{32} & M_{33} & M_{34} \\ M_{41} & M_{42} & M_{43} & M_{44} \end{bmatrix}$$

represents a transformation matrix.

In step 140, the device for cooperatively constructing point cloud map splices the point cloud data of the first road section and the transformed point cloud data of the second road section to construct a point cloud map of the preset route.

According to the above, the point cloud data of the second road section has been transformed into the coordinate system of the first road section. Therefore, by splicing the second point cloud data of each single frame point cloud of the first road section and the transformed point cloud data of each single frame point cloud of the second road section, a point cloud map of the first road section and the second road section can be constructed.

If the preset route is divided into more than two road sections, the method of constructing a point cloud map for other adjacent road sections is the same as the method of constructing a point cloud map for the first road section and the second road section, which will not be repeated here.

For any adjacent first road section and second road section in the preset route, according to the point cloud data of the first road section and the transformed point cloud data of the second road section, a point cloud map of the preset route is constructed using a LeGO-LOAM tool. That is, by inputting the point cloud data of each road section into the LeGO-LOAM tool, a point cloud map of the entire route can be constructed.

In the above scheme of cooperatively constructing point cloud map by multiple vehicles, different vehicles collect point cloud data of different road sections in a preset route, point cloud data in an overlapping area of two adjacent road sections is used to determine a transformation matrix used for point cloud data of the two adjacent road sections, point cloud data of different road sections are spliced based on transformed point cloud data to construct a point cloud map of the entire route. Therefore, the efficiency of constructing the point cloud map of the entire route is improved, and it can be applied to the business scenario of online point cloud map construction. In addition, each vehicle collects point cloud data of one road section, rather than point cloud data of the entire route. Therefore, the accuracy requirements of the map data collection equipment carried by each vehicle are reduced.

Figure 2:
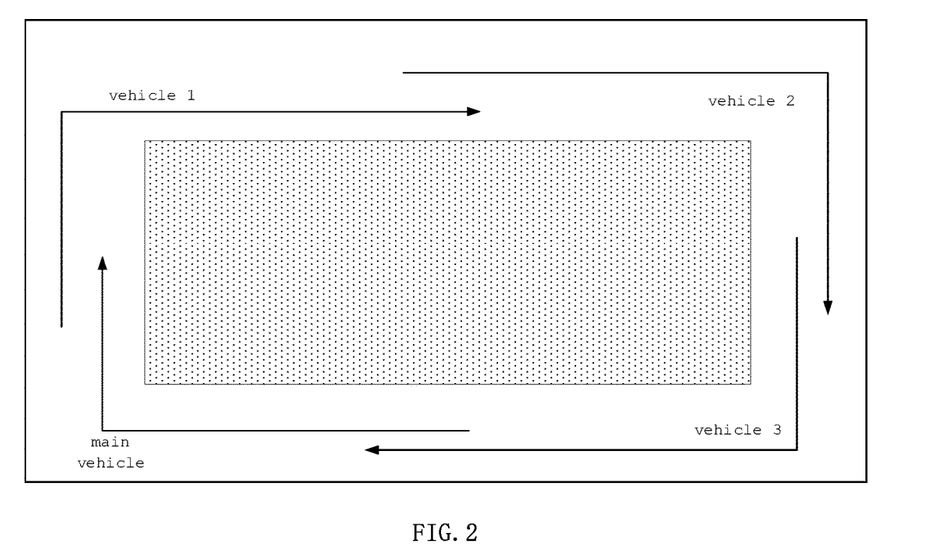
FIG. 2 shows a schematic diagram of an application scenario of cooperatively constructing point cloud map according to some embodiments of the present disclosure.

FIG. 2 shows a schematic diagram of an application scenario of cooperatively constructing point cloud map according to some embodiments of the present disclosure.

The four vehicles cooperate to construct a point cloud map of a rectangular route shown in FIG. 2. Each vehicle is responsible for collecting point cloud data of one road section. Adjacent road sections have an overlapping area. One of the four vehicles acts as a device for cooperatively constructing point cloud map, and is called a main vehicle. The other vehicles are referred to as vehicle 1, vehicle 2, and vehicle 3, respectively. The four vehicles move in the same running direction on the road sections they are responsible for, and collect point cloud data of the road sections they are responsible for simultaneously. Vehicle 1, vehicle 2 and vehicle 3 transmit the collected point cloud data of the corresponding road sections to the main vehicle. According to point cloud data of the corresponding road sections collected vehicle 1, vehicle 2 and vehicle 3, and point cloud data of a corresponding road section collected by the main vehicle itself, the main vehicle constructs a point cloud map of the entire rectangular routine according to the method of the embodiment shown in FIG. 1.

For example, the road section of the main vehicle and the road section of vehicle 1 are adjacent road sections, and the point cloud data of the road section of vehicle 1 is transformed into the coordinate system of the road section of the main vehicle. By splicing the point cloud data of the road section of the main vehicle and the transformed point cloud data of the road section of vehicle 1, a point cloud map of the road section of the main vehicle and the road section of vehicle 1 can be constructed. The road section of the main vehicle and the road section of vehicle 3 are adjacent road sections, and the point cloud data of the road section of vehicle 3 is transformed into the coordinate system of the road section of the main vehicle. By splicing the point cloud data of the road section of the main vehicle and the transformed point cloud data of the road section of vehicle 3, a point cloud map of the road section of the main vehicle and the road section of vehicle 3 can be constructed. Since the point cloud data of the road section of the main vehicle and the road section of vehicle 1 have been unified into the same coordinate system, the road section of the main vehicle and the road section of vehicle 1 are regarded as a combined road section. This combined road section and the road section of vehicle 2 are adjacent road sections, and the point cloud data of the road section of vehicle 2 is transformed into the coordinate system of this combined road section (i.e., the road section of the main vehicle). By splicing the point cloud data of the combined road section and the transformed point cloud data of the road section of vehicle 2, a point cloud map of the combined road section and the road section of vehicle 2 can be constructed. According to the similar processing, a point cloud map of the entire rectangular route is finally constructed.

Figure 3:
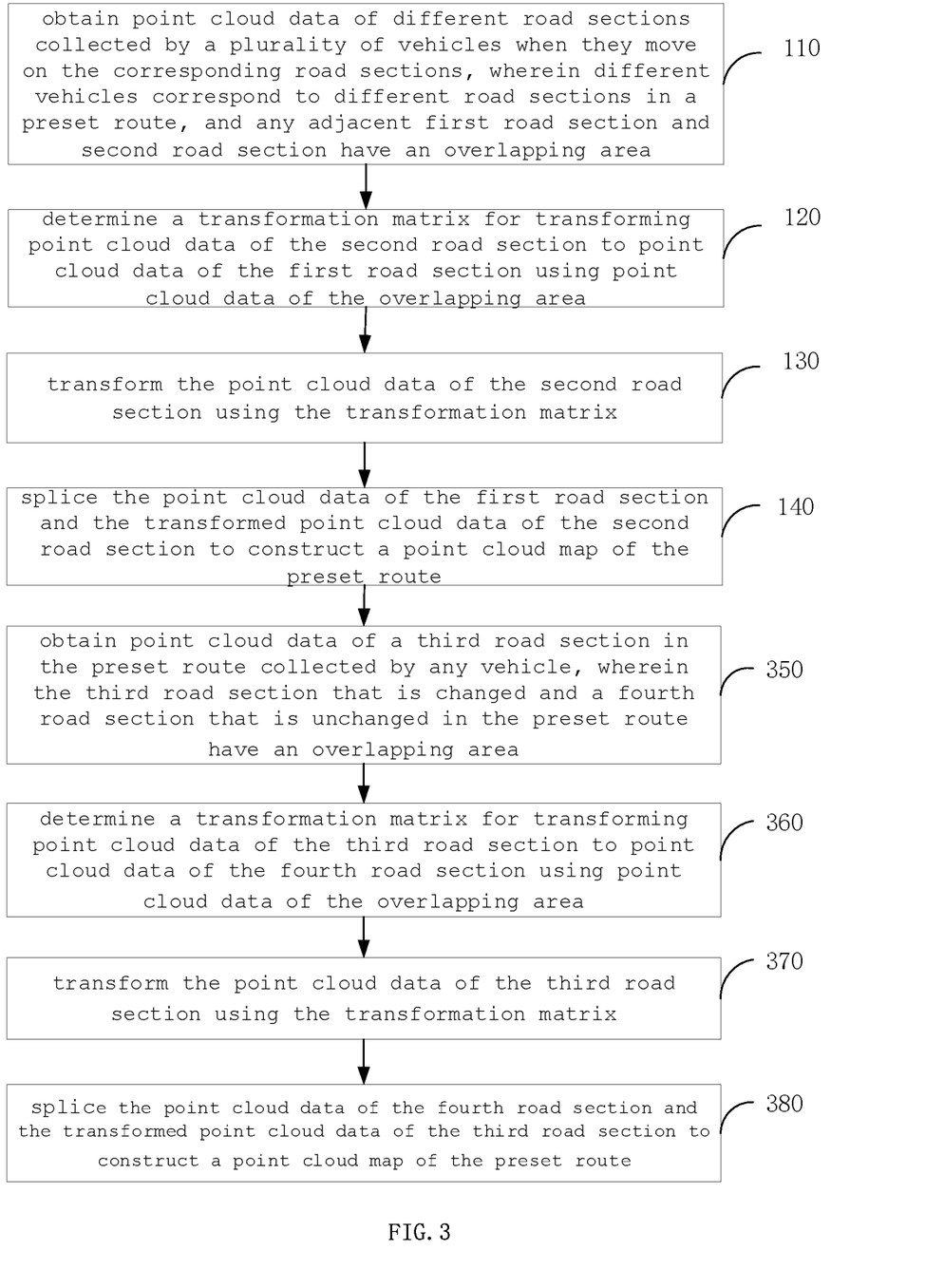
FIG. 3 shows a schematic flowchart of a method for cooperatively constructing point cloud map according to other embodiments of the present disclosure.

FIG. 3 shows a schematic flowchart of a method for cooperatively constructing point cloud map according to other embodiments of the present disclosure.

As shown in FIG. 3, on the basis of the method of the embodiments shown in FIG. 1, this method further comprises: steps 350 to 380.

In step 350, assuming that a certain road section (third road section) in the preset route changes, any vehicle can be assigned to collect point cloud data of the changed third road section and send it to the device for cooperatively constructing point cloud map. The device for cooperatively constructing point cloud map obtains point cloud data collected by any vehicle for a third road section that changes in the preset route, the third road section and an unchanged road section (a fourth road section) in the preset route having an overlapping area.

In step 360, the device for cooperatively constructing point cloud map determines a transformation matrix for transforming point cloud data of the third road section to point cloud data of the fourth road section using point cloud data of the overlapping area.

The method of determining a transformation matrix for transforming point cloud data of the third road section to point cloud data of the fourth road section is the same as the method of determining a transformation matrix for transforming point cloud data of the second road section to point cloud data of the first road section, and reference can be made to the above for details.

In step 370, the device for cooperatively constructing point cloud map transforms the point cloud data of the third road section using the transformation matrix.

The method of transforming the point cloud data of the third road section using a transformation matrix is the same as the method of transforming the point cloud data of the second road section using a transformation matrix, and reference can be made to the above for details.

In step 380, the device for cooperatively constructing point cloud map splices the point cloud data of the fourth road section and the transformed point cloud data of the third road section to construct a point cloud map of the preset route. For the specific splicing method, reference can be made to the above.

Therefore, when a local point cloud map changes, only a point cloud map of the local road section needs to be reconstructed, thereby improving the update efficiency of the point cloud map of the entire route.

Figures 4, 5:
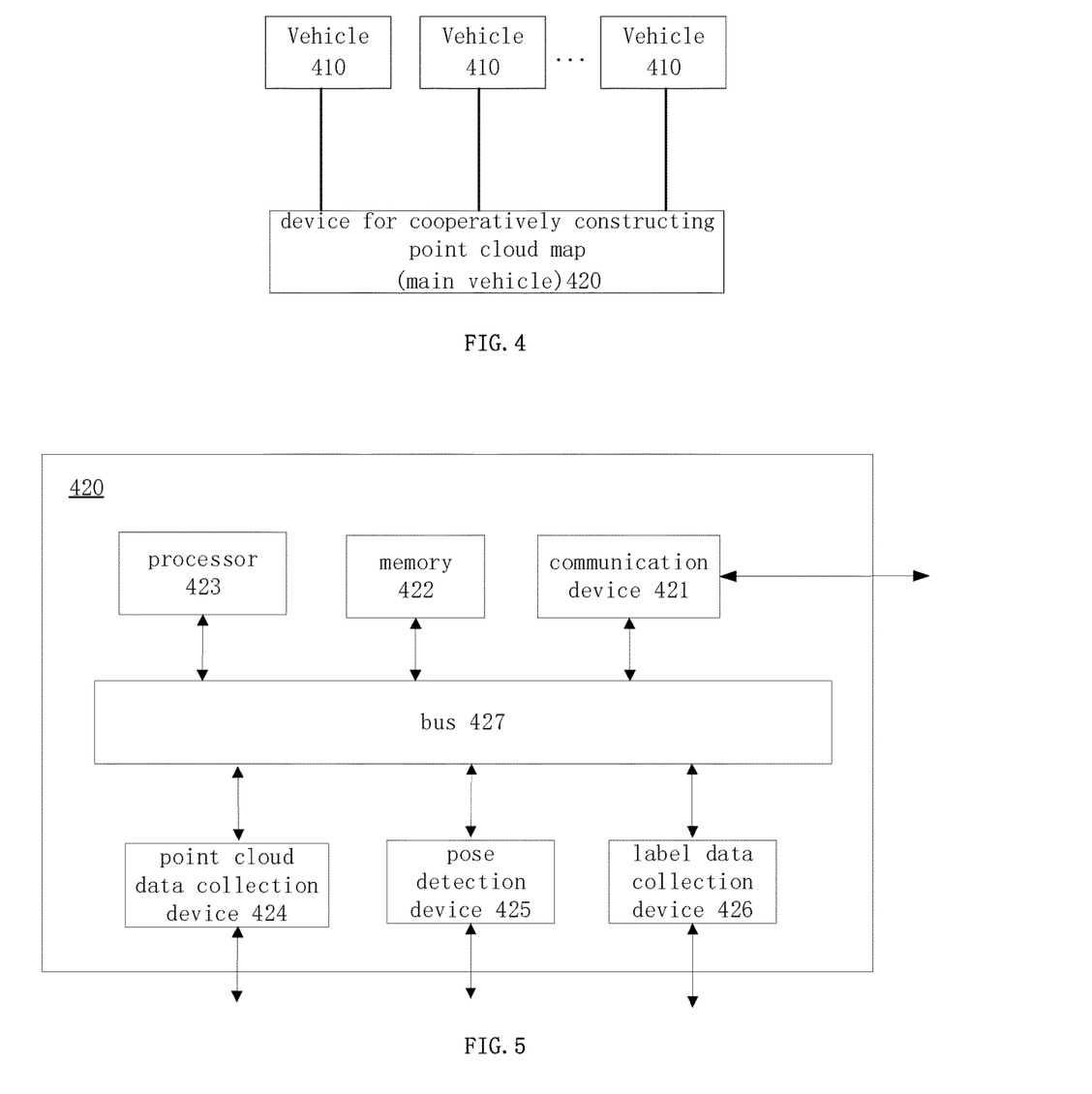
FIG. 4 shows a schematic diagram of a system for cooperatively constructing point cloud map according to some embodiments of the present disclosure.
FIG. 5 shows a schematic diagram of a device for cooperatively constructing point cloud map according to some embodiments of the present disclosure.

FIG. 4 shows a schematic diagram of a system for cooperatively constructing point cloud map according to some embodiments of the present disclosure.

As shown in FIG. 4, the system of this embodiment comprises: a plurality of vehicles 410 and a device 420 for cooperatively constructing point cloud map. The device for cooperatively constructing point cloud map may be, for example, one of the plurality of vehicles, called a main vehicle, or may be another device.

Each of the plurality of vehicles 410 is configured to collect point cloud data of a corresponding road section when it moves in the corresponding road section, and send the collected point cloud data to a device for cooperatively constructing point cloud map, wherein different vehicles correspond to different road sections in a preset route.

The device 420 for cooperatively constructing point cloud map is configured to execute the method for cooperatively constructing point cloud map described in any one of the above embodiments.

For example, the device for cooperatively constructing point cloud map obtains point cloud data of different road sections respectively collected by a plurality of vehicles when they move on the corresponding road sections, wherein different vehicles correspond to different road sections in a preset route, and any adjacent first road section and second road section have an overlapping area; determine a transformation matrix for transforming point cloud data of the second road section to point cloud data of the first road section using point cloud data of the overlapping area; transform the point cloud data of the second road section using the transformation matrix; and splice the point cloud data of the first road section and the transformed point cloud data of the second road section to construct a point cloud map of the preset route.

For another example, the device for cooperatively constructing point cloud map obtains point cloud data of a third road section in the preset route collected by any vehicle, wherein the third road section that is changed and a fourth road section that is unchanged in the preset route have an overlapping area; determines a transformation matrix for transforming point cloud data of the third road section to point cloud data of the fourth road section using point cloud data of the overlapping area; transforms the point cloud data of the third road section using the transformation matrix; and splices the point cloud data of the fourth road section and the transformed point cloud data of the third road section to construct a point cloud map of the preset route.

FIG. 5 shows a schematic diagram of a device for cooperatively constructing point cloud map according to some embodiments of the present disclosure.

As shown in FIG. 5, the device 420 for cooperatively constructing point cloud map of this embodiment comprises: a communication device 421 configured to obtain point cloud data of different road sections respectively collected by a plurality of vehicles when they move on the corresponding road sections; a memory 422; and a processor 423 coupled to the memory and configured to perform the method for cooperatively constructing point cloud map according to any one of the above embodiments based on instructions stored in the memory. For the specific content, please refer to the above, and will not be repeated here.

The communication device 421 may be, for example, a wireless communication means, such as a wireless local area network communication device, or a mobile network communication device, such as a 5G mobile network communication device, a 4G mobile network communication device, and the like.

The memory 422 may include, for example, system memory, a fixed non-volatile storage medium, or the like. The system memory stores, for example, an operating system, application programs, a boot loader, and other programs.

In some embodiments, the device 420 for cooperatively constructing point cloud map may be, for example, one of a plurality of vehicles. In this case, the device 420 for cooperatively constructing point cloud map further comprises:
- a point cloud data collection device 424, such as a lidar device, configured to collect various single frame point clouds of a road section when it moves in the corresponding road section, wherein the point cloud data collected by the lidar device comprises information such as reflected signal strength, in addition to point position information;
- a pose detection device 425, such as an inertial navigation device, configured to, for each single frame point cloud, detect relative pose information of a current pose corresponding to this single frame point cloud with respect to a start pose corresponding to a start single frame point cloud; and
- a label data collection device 426, such as a global positioning and navigation device or a camera device, configured to collect label data corresponding to a single frame point cloud when the single frame point cloud is collected.

The above devices 421 to 426 may be connected via a bus 427, for example.

The present disclosure further provides a non-transitory computer readable storage medium stored a computer program which when executed by a processor, implements the steps of the method for cooperatively constructing point cloud map of any one of the above embodiments.

Those skilled in the art should understand that the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure can be in a form of one or more computer program products containing computer-executable codes which can be implemented in the computer-executable storage medium (including but not limited to disks, CD-ROM, optical disks, etc.).

The present disclosure is described with reference to flowcharts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general-purpose computer, a special purpose computer, an embedded processor, or other programmable data processing apparatus to generate a machine such that the instructions executed by a processor of a computer or other programmable data processing apparatus to generate means implementing the functions specified in one or more flows of the flowcharts and/or one or more blocks of the block diagrams.

The computer program instructions may also be stored in a computer readable storage device capable of directing a computer or other programmable data processing apparatus to operate in a specific manner such that the instructions stored in the computer readable storage device produce an article of manufacture including instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams. The above is merely preferred embodiments of this disclosure and is not limitation to this disclosure. Within spirit and principles of this disclosure, any modification, replacement, improvement and etc. shall be contained in the protection scope of this disclosure.

What is claimed is:

1. A method for cooperatively constructing point cloud map, comprising:
   obtaining point cloud data of different road sections respectively collected by a plurality of vehicles when they move on the corresponding road sections, wherein different vehicles correspond to different road sections in a preset route, and any adjacent first road section and second road section have an overlapping area;
   determining a transformation matrix for transforming point cloud data of the second road section to point cloud data of the first road section using point cloud data of the overlapping area;

transforming the point cloud data of the second road section using the transformation matrix;

splicing the point cloud data of the first road section and the transformed point cloud data of the second road section to construct a point cloud map of the preset route;

obtaining point cloud data of a third road section in the preset route collected by any vehicle, wherein the third road section that is changed and a fourth road section that is unchanged in the preset route have an overlapping area;

determining a transformation matrix for transforming point cloud data of the third road section to point cloud data of the fourth road section using point cloud data of the overlapping area;

transforming the point cloud data of the third road section using the transformation matrix;

splicing the point cloud data of the fourth road section and the transformed point cloud data of the third road section to construct a point cloud map of the preset route.

2. A method for cooperatively constructing point cloud map, comprising:

obtaining point cloud data of different road sections respectively collected by a plurality of vehicles when they move on the corresponding road sections, wherein different vehicles correspond to different road sections in a preset route, and any adjacent first road section and second road section have an overlapping area, wherein the point cloud data of each road section comprises single frame point clouds of the road section and corresponding label data of each single frame point cloud;

determining a transformation matrix for transforming point cloud data of the second road section to point cloud data of the first road section using point cloud data of the overlapping area, comprising:

determining the transformation matrix for transforming point cloud data of the second road section to point cloud data of the first road section by matching a single frame point cloud of the overlapping area in the first road section and a single frame point cloud of the overlapping area in the second road section with the same label data;

transforming the point cloud data of the second road section using the transformation matrix; and splicing the point cloud data of the first road section and the transformed point cloud data of the second road section to construct a point cloud map of the preset route.

3. The method according to claim 2, wherein determining a transformation matrix for transforming point cloud data of the second road section to point cloud data of the first road section comprises:

taking the single frame point cloud of the overlapping area in the first road section and the single frame point cloud of the overlapping area in the second road section with the same label data as a target point cloud and a source point cloud respectively, and obtaining matched point pairs of the source point cloud and the target point cloud;

constructing a rotation-translation matrix based on the matched point pairs;

transforming the source point cloud using the rotation-translation matrix;

calculating an error between the transformed source point cloud and the target point cloud;

performing the above steps iteratively in the case that the error is greater than a preset error; or stopping the iteration and determining a rotation-translation matrix corresponding to this error as the transformation matrix for transforming point cloud data of the second road section to point cloud data of the first road section in the case that the error is not greater than the preset error.

4. The method according to claim 2, wherein the label data corresponding to each single frame point cloud in each road section comprises at least one of:

current global position information and heading information of a vehicle on this road section when the single frame point cloud of the road section is collected;

an environmental image captured by the vehicle on this road section when the single frame point cloud of the road section is collected.

5. The method according to claim 4, further comprising:

judging as different single frame point clouds with the same label data in the case that a similarity of the feature vectors of the environment images corresponding to different single frame point clouds is greater than the preset value; or judging as different single frame point clouds with the same label data in the case that the global position information and heading information of the vehicles corresponding to different single frame point clouds are the same.

6. The method according to claim 2, wherein each single frame point cloud of the second road section comprises: point cloud data of each single frame point cloud of the second road section and local pose information corresponding to the single frame point cloud, wherein the point cloud data of the single frame point cloud of the second road section comprises: position information of each point constituting the single frame point cloud in a local coordinate system with a vehicle in the second road section as an origin, wherein the local pose information corresponding to the single frame point cloud of the second road section is: relative pose information of a current pose of the vehicle in the second road section when the single frame point cloud of the second road section is collected with respect to a start pose of the vehicle when a start single frame point cloud of the second road section is collected;

wherein transforming the point cloud data of the second road section using the transformation matrix comprises: for each single frame point cloud of the second road section, multiplying its corresponding local pose information by the transformation matrix first, and then by the point cloud data of the single frame point cloud.

7. The method according to claim 2, further comprising:

for each road section, clustering various points of this road section according to its point cloud data;

from the point cloud data of each road section, removing a point set obtained through clustering that matches a shape of a preset moving object.

8. The method according to claim 2, wherein the point cloud data of each road section is point cloud data from which a point set of a preset moving object has been removed, wherein the removing operation comprises clustering, by a vehicle in each road section, various points of the road section based on the point cloud data of the road section, and removing a point set obtained through clustering that matches a shape of a preset moving object from the point cloud data of the road section.

9. The method according to claim 2, wherein constructing a point cloud map of the preset route comprises:

constructing a point cloud map of the preset route using LeGO-LOAM according to the point cloud data of the first road section and the transformed point cloud data of the second road section.

10. A system for cooperatively constructing point cloud map, comprising:
a plurality of vehicles each configured to collect point cloud data of a corresponding road section when it moves in the corresponding road section, and send the collected point cloud data to a device for cooperatively constructing point cloud map, wherein different vehicles correspond to different road sections in a preset route;
a device for cooperatively constructing point cloud map configured to execute the method for cooperatively constructing point cloud map of claim 2.

11. The system according to claim 10, wherein the device for cooperatively constructing point cloud map is one of the plurality of vehicles.

12. A device for cooperatively constructing point cloud map, comprising:
a communication device configured to obtain point cloud data of different road sections respectively collected by a plurality of vehicles when they move on the corresponding road sections;
a memory; and
a processor coupled to the memory and configured to perform the method for cooperatively constructing point cloud map according to claim 2 based on instructions stored in the memory.

13. The device according to claim 12, wherein the device for cooperatively constructing point cloud map is one of the plurality of vehicles;
the device for cooperatively constructing point cloud map further comprises:
a point cloud data collection device, configured to collect various single frame point clouds of a road section when it moves on the corresponding road section;
a pose detection device, configured to, for each single frame point cloud, detect relative pose information of a current pose corresponding to this single frame point cloud with respect to a start pose corresponding to a start single frame point cloud;
a label data collection device, configured to collect label data corresponding to a single frame point cloud when the single frame point cloud is collected.

14. The device according to claim 13, wherein the label data collection device comprises: a global positioning and navigation device; or a camera device.

15. The device according to claim 12, wherein the processor is configured to
take the single frame point cloud of the overlapping area in the first road section and the single frame point cloud of the overlapping area in the second road section with the same label data as a target point cloud and a source point cloud respectively, and obtain matched point pairs of the source point cloud and the target point cloud;
construct a rotation-translation matrix based on the matched point pairs;
transform the source point cloud using the rotation-translation matrix;
calculate an error between the transformed source point cloud and the target point cloud;
perform the above steps iteratively in the case that the error is greater than a preset error; or stop the iteration and determine a rotation-translation matrix corresponding to this error as the transformation matrix for transforming point cloud data of the second road section to point cloud data of the first road section in the case that the error is not greater than the preset error.

16. The device according to claim 12, wherein each single frame point cloud of the second road section comprises point cloud data of each single frame point cloud of the second road section and local pose information corresponding to the single frame point cloud,
wherein the processor is configured to for each single frame point cloud of the second road section, multiply its corresponding local pose information by the transformation matrix first, and then by the point cloud data of the single frame point cloud.

17. The device according to claim 12, wherein the processor is configured to
for each road section, cluster various points of this road section according to its point cloud data;
from the point cloud data of each road section, remove a point set obtained through clustering that matches a shape of a preset moving object.

18. The device according to claim 12, wherein the processor is configured to construct a point cloud map of the preset route using LeGO-LOAM according to the point cloud data of the first road section and the transformed point cloud data of the second road section.

19. A non-transitory computer readable storage medium storing a computer program which when executed by a processor implements the steps of the method for cooperatively constructing point cloud map according to claim 2.

* * * * *